US010726696B1

(12) United States Patent
DeLintt et al.

(10) Patent No.: US 10,726,696 B1
(45) Date of Patent: Jul. 28, 2020

(54) APPARATUS AND METHODS FOR PROVIDING EMERGENCY ALERTS AND SECURING A PREMISES

(71) Applicant: RADE SECURITY SOLUTIONS, LLC, Las Vegas, NV (US)

(72) Inventors: Robert T. DeLintt, Mesa, AZ (US); Eric M. Barber, Phoenix, AZ (US)

( * ) Notice: Subject to any disclaimer, the term of this patent is extended or adjusted under 35 U.S.C. 154(b) by 0 days.

(21) Appl. No.: 16/351,923

(22) Filed: Mar. 13, 2019

(51) Int. Cl.

| | |
|---|---|
| ***G05B 21/00*** | (2006.01) |
| ***G08B 21/02*** | (2006.01) |
| ***G08B 25/00*** | (2006.01) |
| ***G08B 25/10*** | (2006.01) |
| ***G08B 27/00*** | (2006.01) |
| ***G08B 5/22*** | (2006.01) |
| ***G08B 3/10*** | (2006.01) |

(52) U.S. Cl.
CPC ........... *G08B 21/02* (2013.01); *G08B 3/1016* (2013.01); *G08B 5/223* (2013.01); *G08B 25/008* (2013.01); *G08B 25/10* (2013.01); *G08B 27/005* (2013.01); *G08B 27/006* (2013.01)

(58) Field of Classification Search
CPC ...... G08B 21/02; G08B 3/1016; G08B 5/223; G08B 25/008; G08B 25/10; G08B 27/005; G08B 27/006
USPC ........................................................ 340/540
See application file for complete search history.

(56) References Cited

U.S. PATENT DOCUMENTS

| | | | | |
|---|---|---|---|---|
| 6,249,225 | B1 * | 6/2001 | Wang .................. | G08B 25/008 340/330 |
| 7,053,755 | B2 | 5/2006 | Atkins et al. | |
| 9,167,402 | B2 | 10/2015 | Sammour et al. | |
| 9,171,450 | B2 | 10/2015 | Cho et al. | |
| 9,202,364 | B2 * | 12/2015 | Siber .................... | G08B 27/005 |
| 9,472,091 | B2 | 10/2016 | Stern et al. | |
| 9,609,128 | B2 | 3/2017 | Dahan et al. | |
| 9,685,067 | B2 | 6/2017 | Shaw | |
| 2004/0057567 | A1 * | 3/2004 | Lee ....................... | H04M 9/001 379/167.01 |
| 2005/0186937 | A1 * | 8/2005 | Graham .................. | H04L 12/66 455/404.1 |
| 2007/0216764 | A1 * | 9/2007 | Kwak ................ | G07C 9/00309 348/14.06 |

(Continued)

*Primary Examiner* — Zhen Y Wu
(74) *Attorney, Agent, or Firm* — Michael W. Goltry; Robert A. Parsons; Parsons & Goltry, PLLC

(57) ABSTRACT

A security system includes an individual subscriber unit, an emergency alarm device proximate to a location frequented by people, and a control system configured to a) receive an emergency alert message from the individual subscriber unit, b) receive an emergency stand-down message from the individual subscriber unit, c) automatically transmit an emergency alert signal in response to the control system receiving the emergency alert message from the individual subscriber unit, and d) automatically transmit an emergency stand-down signal in response to the control system receiving the emergency stand-down message from the individual subscriber unit. The emergency alarm device is operatively coupled to the control system for automatically activating for issuing an alert for warning people at the location that an emergency is present, in response to the emergency alert signal, and automatically deactivating for terminating the alert, in response to the emergency stand-down signal.

30 Claims, 6 Drawing Sheets

(56) References Cited

U.S. PATENT DOCUMENTS

2009/0189758 A1* 7/2009 Liu .................. G08B 13/19621 340/539.11
2011/0032073 A1* 2/2011 Mullet ............... G07C 9/00182 340/5.7
2011/0037593 A1* 2/2011 Foisy ................... G08B 25/001 340/540
2011/0313893 A1* 12/2011 Weik, III ................ B60R 25/00 705/28
2012/0188054 A1* 7/2012 Bongard ............ G07C 9/00309 340/5.61
2013/0249670 A1* 9/2013 Lee .................... G07C 9/00174 340/5.61
2014/0025724 A1 1/2014 Granger et al.
2014/0253316 A1* 9/2014 Addy ..................... G06Q 10/06 340/506
2014/0266585 A1* 9/2014 Chao ..................... H04W 4/029 340/5.61
2015/0116490 A1* 4/2015 Scalisi ................... H04N 7/186 348/143
2015/0248832 A1* 9/2015 Piccolo, III .......... G08B 29/145 340/514
2015/0339870 A1* 11/2015 Cojocaru ............... G08B 25/14 340/5.53
2016/0189532 A1* 6/2016 Malhotra ............. G08B 29/185 340/506
2016/0344091 A1* 11/2016 Trani ..................... G07C 9/253
2017/0154483 A1* 6/2017 Cordiner ............ G07C 9/00571
2017/0171717 A1* 6/2017 Shulman ................. H04W 4/33
2017/0180255 A1 6/2017 Dahan et al.
2017/0238154 A1* 8/2017 Vagelos .................. H04W 4/90 455/466
2017/0253316 A1* 9/2017 Benthien ................. B64C 1/068
2017/0265039 A1* 9/2017 Bruck .................... H04W 4/025
2017/0287319 A1* 10/2017 Moffa .................. G08B 29/145
2018/0174415 A1* 6/2018 Clark ................. G08B 13/2454
2018/0261078 A1 9/2018 Meredith et al.
2018/0348718 A1* 12/2018 Richardson ........... H04W 4/029
2018/0349651 A1* 12/2018 Snediker ................. G06F 21/88
2019/0035190 A1* 1/2019 Szczygiel .......... G07C 9/00571
2019/0304289 A1* 10/2019 Sol ................... G08B 13/19689
2019/0340852 A1* 11/2019 Kuenzi .............. G07C 9/00904
2019/0349360 A1* 11/2019 Yeddula .................. H04L 63/10

* cited by examiner

APPARATUS AND METHODS FOR PROVIDING EMERGENCY ALERTS AND SECURING A PREMISES

FIELD OF THE INVENTION

The present invention relates to premises security systems and methods.

BACKGROUND OF THE INVENTION

Security is the condition of being protected against danger or loss. Security is a concept like safety. The nuance between the two is an added emphasis on being protected from dangers that originate from outside. Individuals or actions that encroach upon the condition of protection are responsible for the breach of security.

There is an immense literature on the analysis and categorization of security. Part of the reason for this is that, in most security systems, the "weakest link in the chain" is the most important. The situation is asymmetric since the defender must cover all points of attack while the attacker can simply identify a single weak point upon which to concentrate their efforts.

Of interest in the field of security is school security, which encompasses all measures taken to combat threats to people and property in education environments. School security, commonly referred to as school safety, concerns the sheltering students from violence and exposure to drugs, gang activity, and other harmful elements and events. Like most public places, schools are at risk for violence from outside intruders in addition to students and faculty because of the high traffic of potential assailants and the availability of victims. The vulnerability of schools to shootings is evident by the hundreds of shootings that have occurred in schools through the United States since 1990, compared to the approximately 50 school shootings the previous 30 years. While school bombings are less frequent than school shootings, a 2016 United States Bomb Data Center Explosive Incident Report found that education-related buildings are threatened more than two times that of any other target.

Because of the inherent vulnerability of schools to shootings and bombings, most schools throughout the United States implement various premises security measures designed to bolster school safety. For instance, since 2013 the majority of public schools lock or monitor doors and gates to control school access. Metal detectors are also employed at school entrances to prevent weapons from being brought into the schools. Surveillance systems, identification cards and badges, and security fencing are also now commonly employed. While these means of premises security, measures designed to circumvent attackers or intruders, are widely employed in public and private schools, and often in office buildings, military bases, hydroelectric plants, etc., they are either ineffectual, expensive, or require costly specially-trained security personnel. Given these and other deficiencies in the art, the need for continuing improvement in the art of premises security is evident.

SUMMARY OF THE INVENTION

According to the principle of the invention, a security system includes an individual subscriber unit, an emergency alarm device deployed proximate to a location frequented by people, and a control system. The control system is configured to a) receive an emergency alert message from the individual subscriber unit, b) receive an emergency stand-down message from the individual subscriber unit, c) automatically transmit an emergency alert signal in response to the control system receiving the emergency alert message from the individual subscriber unit, and d) automatically transmit an emergency stand-down signal in response to the control system receiving the emergency stand-down message from the individual subscriber unit, and the emergency alarm device is operatively coupled to the control system for automatically issuing an alert for warning people at the location that an emergency is present, in response to the emergency alert signal, and automatically terminating the alert, in response to the emergency stand-down signal. The emergency alarm device is an aural emergency alarm device, and the alert is an audible alert. In another embodiment, the emergency alarm device is a visual emergency alarm device, and the alert is a visual alert. The emergency alarm device is stand-alone and operatively coupled wirelessly to the control system. In an illustrative embodiment, the location is an inside of a building, and there are a door by which an entry is closed when the door is in a closed position and opened when the door is in an open position, and an electronic door for automatically locking for locking the door in the closed position in response to the emergency alert signal, and automatically unlocking for unlocking the door from the closed position in response to the emergency stand-down signal. In another embodiment, the location is an outside gated area, and there are a gate by which an entry to the outside gated area is closed when the gate is in a closed position and opened when the gate is in an open position, and an electronic gate lock for automatically locking for locking the gate in the closed position in response to the emergency alert signal, and automatically unlocking for unlocking the gate from the closed position in response to the emergency stand-down signal. An automated communication architecture is operatively coupled to the control system for automatically issuing an electronic emergency notification, in response to the emergency alert signal. The control system is additionally configured to automatically issue an emergency initiated message to the individual subscriber unit, in response to the control system receiving the emergency alert message from the individual subscriber unit, and to automatically issue an emergency terminated message to the individual subscriber unit, in response to the control system receiving the emergency stand-down message from the individual subscriber unit.

According to the principle of the invention, a security system includes a first individual subscriber unit, a second individual subscriber unit, an emergency alarm device proximate to a location frequented by people, and a control system. The control system is configured to a) receive an emergency alert message from the first individual subscriber unit, b) receive an emergency stand-down message from the second individual subscriber unit, c) automatically transmit an emergency alert signal in response to the control system receiving the emergency alert message from the first individual subscriber unit, and d) automatically transmit an emergency stand-down signal in response to the control system receiving the emergency stand-down message from the second individual subscriber unit, and the emergency alarm device is operatively coupled to the control system for automatically issuing an alert for warning people at the location that an emergency is present, in response to the emergency alert signal, and automatically terminating the alert, in response to the emergency stand-down signal. The first individual subscriber unit and the second individual subscriber unit are different from one another, meaning that they are not the same unit, and the control system is disabled from receiving the emergency stand-down message from the first individual subscriber unit. The emergency alarm device is an aural emergency alarm device, and the alert is an audible alert. In another embodiment, the emergency alarm device is a visual emergency alarm device, and the alert is a visual alert. The emergency alarm device is stand-alone and operatively coupled wirelessly to the control system. In an illustrative embodiment, the location is an inside of a building, and there are a door by which an entry is closed when the door is in a closed position and opened when the door is in an open position, and an electronic door lock for automatically locking for locking the door in the closed position in response to the emergency alert signal, and automatically unlocking for unlocking the door from the closed position in response to the emergency stand-down signal. In another embodiment, the location is an outside gated area, and there are a gate by which an entry to the outside gated area is closed when the gate is in a closed position and opened when the gate is in an open position, and an electronic gate lock for automatically locking for locking the gate in the closed position in response to the emergency alert signal, and automatically unlocking for unlocking the gate from the closed position in response to the emergency stand-down signal. An automated communication architecture is operatively coupled to the control system for automatically issuing an electronic emergency notification, in response to the emergency alert signal. The control system is additionally configured to automatically issue an emergency initiated message to the first individual subscriber unit and the second individual subscriber unit, in response to the control system receiving the emergency alert message from the first individual subscriber unit, and to automatically issue an emergency terminated message to the first individual subscriber unit and the second individual subscriber unit, in response to the control system receiving the emergency stand-down message from the second individual subscriber unit.

According to the principle of the invention, a security system includes first individual subscriber units, a second individual subscriber unit, emergency alarm devices proximate to different locations each frequented by people, and a control system. The control system is configured to a) receive an emergency alert message from each of the first individual subscriber units, b) receive an emergency stand-down message from the second individual subscriber unit, c) automatically transmit an emergency alert signal in response to the control system receiving the emergency alert message from any of the first individual subscriber units, and d) automatically transmit an emergency stand-down signal in response to the control system receiving the emergency stand-down message from the second individual subscriber unit, the emergency alarm devices are each operatively coupled to the control system for automatically issuing an alert for warning people at the respective location that an emergency is present, in response to the emergency alert signal, and automatically terminating the alert, in response to the emergency stand-down signal, and the first individual subscriber units and the second individual subscriber unit are different from one another, meaning that they are not the same unit, and the control system is disabled from receiving the emergency stand-down message from each of the first individual subscriber units. Each emergency alarm device is at least one of a) an aural emergency alarm device and the alert is an audible alert, and b) a visual emergency alarm device and the alert is a visual alert. Each emergency alarm device is stand-alone and operatively coupled wirelessly to the control system. In an illustrative embodiment, the locations are partitioned parts of an inside of a building, and there are doors by which entries to the partitioned parts are closed when the doors are in closed positions and opened when the doors are in open positions, and electronic door locks operatively for automatically locking for locking the respective doors in the closed positions in response to the emergency alert signal, and automatically unlocking for unlocking the respective doors from the closed position in response to the emergency stand-down signal. The building is located within an outside gated area, and there are a gate by which an entry to the outside gated area is closed when the gate is in a closed position and opened when the gate is in an open position, and an electronic gate lock for automatically locking for locking the gate in the closed position in response to the emergency alert signal, and automatically unlocking for unlocking the gate from the closed position in response to the emergency stand-down signal. An automated communication architecture is operatively coupled to the control system for automatically issuing an electronic emergency notification, in response to the emergency alert signal. The control system is additionally configured to automatically issue an emergency initiated message to the first individual subscriber units and the second individual subscriber unit, in response to the control system receiving the emergency alert message from any of the first individual subscriber units, and to automatically issue an emergency terminated message to the first individual subscriber units and the second individual subscriber unit, in response to the control system receiving the emergency stand-down message from the second individual subscriber unit.

According to the principle of the invention, an apparatus includes a first individual subscriber unit, a processor, a transceiver coupled with the processor, an emergency alarm device proximate to a location frequented by people, and memory including executable instructions stored thereon that when executed by the processor cause the processor to effectuate operations in real-time including receiving via the transceiver an emergency alert message from the individual subscriber unit, and automatically transmitting an emergency alert signal via the transceiver responsive to the receiving via the transceiver the emergency alert message from the individual subscriber unit, wherein the emergency alarm device automatically issues an alert for warning people at the location that an emergency is present, in response to the emergency alert signal. Additionally included is a second individual subscriber unit different from the first individual subscriber unit, meaning that the second individual subscriber unit is not the same unit as the first individual subscriber unit, and additional operations include receiving via the transceiver an emergency stand-down message from the second individual subscriber unit, and automatically transmitting an emergency stand-down signal via the transceiver responsive to the receiving via the transceiver the emergency stand-down message from the second individual subscriber unit, wherein the emergency alarm device automatically terminates the alert, in response to the emergency stand-down signal. The emergency alarm device is an aural emergency alarm device, and the alert is an audible alert. In another embodiment, the emergency alarm device is a visual emergency alarm device, and the alert is a visual alert. The emergency alarm device is stand-alone and coupled wirelessly with the transceiver. The location is an inside of a building, and there are a door by which an entry to inside of the building or to a part of the inside of the building is closed when the door is in a closed position and opened when the door is in an open position, and an electronic door lock for automatically locking for locking the door in the closed position in response to the emergency alert signal, and automatically unlocking for unlocking the door from the closed position in response to the emergency stand-down signal. The building is located within an outside gated area, and there are a gate by which an entry to the outside gated area is closed when the gate is in a closed position and opened when the gate is in an open position, and an electronic gate lock for automatically locking for locking the gate in the closed position in response to the emergency alert signal, and automatically unlocking for unlocking the gate from the closed position in response to the emergency stand-down signal. Additionally included is an automated communication architecture for automatically issuing an electronic emergency notification, in response to the emergency alert signal. A messaging server is coupled with the processor. A further operation responsive to the receiving via the transceiver the emergency alert message from the first individual subscriber unit include messaging server automatically issuing an emergency initiated message to the first individual subscriber unit and the second individual subscriber unit via transceiver. Yet another operation responsive to the receiving via the transceiver the emergency stand-down message from the second individual subscriber unit include the messaging server automatically issuing an emergency terminated message to the first individual subscriber unit and the second individual subscriber unit via the transceiver. An additional operation responsive to receiving via the transceiver the emergency alert message from the first individual subscriber unit includes the messaging server automatically issuing a headcount request message to at least one of the first individual subscriber unit and the second individual subscriber unit via the transceiver.

Consistent with the foregoing illustrative embodiments and the ensuing disclosure, the invention also provides associated method and apparatus embodiments.

BRIEF DESCRIPTION OF THE DRAWINGS

Referring to the drawings.

DETAILED DESCRIPTION

Figure 1:
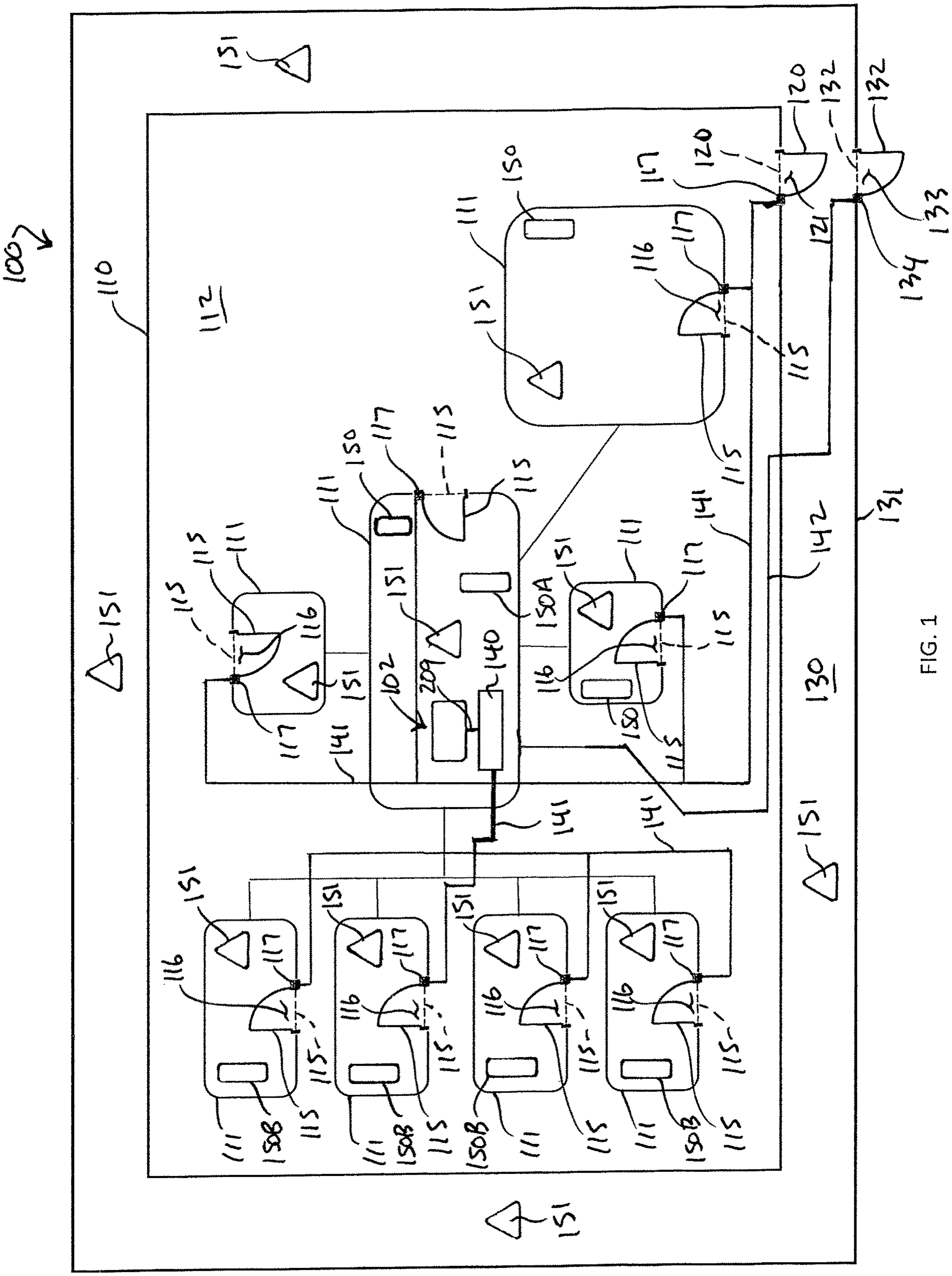
FIG. 1 is a highly generalized schematic representation a security system constructed and arranged in accordance with the principle of the invention and show as it would appear deployed at a facility for providing security in vicinities of the facility.

Turning now to the drawings, in which like reference characters indicate corresponding elements throughout the several views, attention is first directed to FIG. 1 showing a highly generalized schematic representation of a facility 100 incorporating a security system 102 constructed and arranged in accordance with the principle of the invention for providing real-time security in vicinities of facility 100. Facility 100 is a "premises," namely, one or more buildings together with its grounds or other appurtenances. Accordingly, security system 102 is a premises security system. Being a premises, facility 100 in this example is a standard relatively permanent construction over a plot of land, including at least one building 110 being a standard enclosed construction having a standard roof and usually standard windows and various standard hallways, rooms 111, and often more than one level, used for one or more selected purpose, such as a business purpose, educational purpose, etc. Each room 111 is a standard room, namely, a partitioned part of inside of building 110. Each room 111 includes a standard door 115 by which entry 116 to within the corresponding room 111 is closed when door 115 is in a closed position indicated the dotted line position of door 115 and opened when door 115 is in an open position as shown. Doors 115 each include a standard electronic door lock 117 for automatically locking for locking the corresponding door 115 in the closed position, and automatically unlocking for unlocking the corresponding door 115 from the closed position.

Building 110 further includes at least one standard exterior or main door 120 by which entry 121 to within building 110 is closed when door 120 is in a closed position indicated the dotted line position of door 120 and opened when door 120 is in an open position as shown. Like doors 115, door 120 also includes standard electronic door lock 117 for automatically locking for locking door 120 in the closed position, and automatically unlocking for unlocking door 120 from the closed position. Building 110 is formed with one exterior or main door 120 in this example, and it can be formed with more than one exterior or main door in alternate embodiments.

In the example of FIG. 1, facility 100 is a gated facility, which means that building 110 is located within outside gated area 130. Outside gated area 130 is defined and bound by a standard enclosure 131 of one or more fences or walls of wood, metal, masonry, or other chosen material or combination of materials and which is formed with a standard gate 132 by which entry 133 through enclosure 131 to within outside gated area 130 is closed when gate 132 is in a closed position indicated the dotted line position of gate 132 and opened when gate 132 is in an open position as shown. Gate 132 includes a standard electronic gate lock 134 for automatically locking for locking gate 132 in the closed position, and automatically unlocking for unlocking gate 132 from the closed position. Enclosure 131 is formed with one gate 132 in this example, and it can be formed with more than one gate in alternate embodiments.

Facility 100 is a standard building construction frequented by people and used for one or more chosen purposes. Security system 102 is deployed in facility 100. In this example, facility 100 is generally representative of a standard school, namely, an institution for instruction frequented customarily by people including students, instructors/teachers, administrators, employees, etc. Accordingly, in this example building 110 is a school building, and outside gated area 130 is, or is a part of, the outside part of a school campus. Rooms 111 define the various customary rooms of a school, including classrooms where teachers provide instruction to students, staff rooms where staff perform various duties related to the operation of the school, workshops where handcrafts are carried on, cafeterias where students eat meals, offices where administrative personnel work, lavatories fitted with equipment for people to wash the hands and face and use toilet facilities, gyms where students exercise, and the like.

Electronic door locks 117 are entirely standard and well known and are customarily electrically connected via conventional electrical wiring 141 of building 110 to a standard control mechanism or controller 140 used to operate locks 117, whether manually or automatically according to a predetermined operation schedule. Controller 140 is located within building 110 in this example, such as in a utility closet, server room, or the like, and it can be located elsewhere, such as a designated remote location. Electronic gate lock 134 is also standard and well known and is customarily electrically connected via conventional electrical wiring 142 of building 110 to controller 140 used to operate lock 134, whether manually or automatically according to predetermined operation schedule as with electronic locks 117.

Security system 102 is incorporated in facility 100. Security system 102 is uniquely useful for enabling users to activate alarms deployed at facility 100 in real-time, the term "real-time" meaning the actual time during which a process takes place or an event occurs, for alerting the school population in real-time, via penetrating warning illumination and/or penetrating warning sounds, of perceived, impending, or actual threat to health or safety and enabling the population of facility 100 to in response protect themselves, evacuate, and generally take any-and-all necessary steps to protect themselves from a given threat, notify emergency services, and lockdown facility 100, including building 110 and outside gated area 130 simply by sending text messages using standard individual subscriber units of security system 102. Activating local alarms of security system 102 deployed at facility 100, notifying emergency services, and locking down facility 100 using individual subscriber units of security system 102 in real-time is particularly advantageous given that individual subscriber units are readily available and are now customarily carried by the vast majority of people in modern society.

Security system 102 includes individual subscriber units (ISUs) 150, emergency alarm devices 151, and control system 152, according to the invention. Each ISU 150 is a standard and well-known wireless communications device capable of communicating through wireless networks, such as a wireless computer network or Internet and a wireless telephonic network or cellular network. Each ISU 150 is a mobile device, namely, a standard cellular phone, tablet computer, or other hand held and cellular-enabled device designed to communicate through a standard wireless computer/telephonic network. Such mobile devices are ubiquitous and well-known. In alternate embodiments, an individual subscriber unit can also be a personal digital assistant, a computer, a laptop computer, or other form of conventional or readily-available communications device structured to communicate through a standard computer/telephonic network, such as a local network, an Internet, or the like. Each ISU 150 customarily belongs to a user/holder.

Each ISU 150 that is a part of security system 102 is "registered" with security system 102, and is therefore considered a "registered" or "authorized" ISU in security system 102. Each ISU 150 is customarily assigned one or more addresses, including a telephone number used by others to issue calls to ISU 150, such as voice calls, text message calls or simply text messages, and/or an email address used by others to issue emails, text messages sent by email, to ISU 150. The holders of ISUs 150 in security system 102 are "registered" or "authorized" users. In a preferred application, each authorized user is a person who frequents building 110 including one or more of rooms 111 and outside gated area 130, such as an employee of facility, such as a teacher, an administrator, a principal, a vice principal, a security guard, etc. An authorized person can also be a selected and trusted student of the school, a local police officer, a private contractor, etc. At least one of ISUs 150 of security system 102, which is denoted at 150A in FIG. 1 for ease of discussion, is what is referred to as an "administrator," "boss," or "manager" ISU held by a designated authorized user, such as a principal, a vice principle, an administrator, a security officer, or other chosen authorized user of security system 102. In the present example, security system 102 incorporates one boss ISU 150A, with the understanding that security system 102 can incorporate more than one boss ISU 150A in alternate embodiments.

Devices 151 are deployed at and throughout facility 100, including in and around building 110, including proximate to rooms 111 and other areas where persons routinely gather, and in and around outside gated area 130. Control system 152 is configured and enabled to receive an "emergency alert message" directly from any of ISUs 150, receive an "emergency stand-down message" directly from only a boss ISU 150A or each boss ISU 150A when security system 102 incorporates more than one boss ISU 150A, automatically transmit an emergency alert signal in real-time in response to control system 152 receiving the emergency alert message directly from any of ISUs 150, and automatically transmit an emergency stand-down signal in real-time in response to control system 152 receiving the emergency stand-down message directly from a boss ISU 150A. Control system 152 is, according to the invention, disabled from receiving the emergency stand-down message from all ISUs 150 other than a boss ISU 150A. Accordingly, only a boss ISU 150A is privileged to send the emergency stand-down message to control system 152. This is a safeguard to control the emergency stand-down message.

The emergency alert message is a text message, such as "lockdown," "emergency," "alert," "emergency alert," "alpha 1," "code 1," "1-2-3," or other chosen word, phrase, alphanumeric wording, or number sent to control system 152 from any of ISUs 150 that control system 152 is configured via programming to recognize and process operations in response. The emergency stand-down message is also a text message, such as "release," "all clear," "release from lockdown," "alpha 2," 1-2-3-4," or other chosen word, phrase, alphanumeric wording, or number sent to control system 152 from any boss ISU 150A that control system 152 is configured via programming to recognize and process operations in response.

Devices 151 are identical in that they are each operatively coupled to control system 152 for automatically issuing an alert designed to warn people in the vicinity thereof that an emergency is present, in real-time in response to the emergency alert signal, and automatically terminating the alert, in real-time in response to the emergency stand-down signal. In one embodiment, each device 151 is an aural emergency alarm device for issuing an audible alert characterized by a penetrating warning sound for audibly indicating an emergency situation. In another embodiment, each device 151 is a visual emergency alarm device for issuing a visual alert characterized by a penetrating warning light for visually indicating an emergency situation. Each device 151 can be at least one of an aural emergency alarm device, and a visual emergency alarm device. Accordingly, each device 151 can be configured as either an aural emergency alarm device, a visual emergency alarm device, or both in a preferred embodiment.

Devices 151 are preferably stand-alone, meaning self-contained and able to operate without other hardware or software, battery-powered, and operatively coupled to control system 152 for wirelessly receiving the emergency alert and emergency stand-down signals from control system 152. In a particular embodiment, devices are battery-powered, and operatively coupled wirelessly to control system 152 for wirelessly receiving the emergency alert and emergency stand-down signals from control system 152. It is particularly advantageous that in a preferred embodiment devices 151 are stand-alone, battery-powered, and operatively coupled/connected wirelessly to control system 152, because devices 151 can be positioned anywhere and easily repositioned as needed without interfering with the operation of devices 151 or their operative coupling to control system 152, and incorporated into a given facility without having to modify the facility in any way or electrically connect devices 151 to standard electrical wiring electrically connecting devices 151 to controller 140 or control system 152. If desired, and in accordance with an alternate embodiment, devices 151 can be electrically and operatively coupled to control system 152, whether directly to control system 152 or indirectly to control system 152 via controller 140, by standard electrical wiring for receiving the emergency alert and emergency stand-down signals from control system 152. Accordingly, devices 151 can each be operatively coupled wirelessly to control system 152, operatively coupled electrically directly to control system 152 or indirectly to control system 152 directly to controller 140 via conventional electrical wiring, or both if so desired as a safeguard.

Electronic door locks 117 are operatively coupled to control system 152 for automatically locking for locking doors 115 and 120 in the closed positions in real-time in response to the emergency alert signal for closing entries 116 to rooms 111A and closing entry 121 to building 110 thereby locking down building 110, and automatically unlocking for unlocking doors 115 and 120 from the closed positions in real-time in response to the emergency stand-down signal. In other words, electronic door locks 117 are operatively coupled to receive the emergency alert signal and the emergency stand-down signal, for automatically locking for locking doors 115 and 120 in the closed positions in real-time in response to the emergency alert signal for closing entries 116 to rooms 111A and closing entry 121 to building 110 thereby locking down building 110, and automatically unlocking for unlocking doors 115 and 120 from the closed positions in real-time in response to the emergency stand-down signal.

Electronic gate lock 134 is similarly operatively coupled to control system 152 for automatically locking for locking gate 132 in the closed position in real-time in response to the emergency alert signal thereby locking down outside gated area 130, and automatically unlocking for unlocking gate 132 from the closed position in real-time in response to the emergency stand-down signal. In other words, electronic gate lock 134 is operatively coupled to receive the emergency alert signal and the emergency stand-down signal, for automatically locking for locking gate 132 in the closed position in real-time in response to the emergency alert signal thereby locking down outside gated area 130, and automatically unlocking for unlocking gate 132 from the closed position in real-time in response to the emergency stand-down signal.

Control system 152 is additionally configured to automatically issue an electronic emergency notification for alerting emergency services or responders, in real-time in response to the emergency alert signal. According to this disclosure and a standard definition, the term "electronic emergency notification" or simply "electronic notification" means any automated communication sent from an automated communication architecture received by e-mail, phone, text message, fax, etc. Electronic notifications have thousands of applications for businesses, governments, schools and individuals, and are well-known. In security system 102, the electronic notification is designed to be received by emergency services or responders for alerting the emergency services or responders to an emergency requiring the dispatch of the emergency services or responders to respond to the emergency. As a matter of example, the electronic notification is a text message on an ISU, an email message on an ISU, a phone call that plays a pre-recorded emergency message once the call has been answered, each in response to the emergency alert signal, for enabling the emergency services or responders to be alerted to an emergency and to appropriately respond to the emergency by dispatching police, fire, or other responders to the emergency. In security system 102, each message is pre-recorded and stored in storage or memory for use when needed and designed to report an emergency at the location of building 110, such as "Emergency at Borah High School, 6001 W. Cassia Street, Boise, Id. 83709! Dispatch emergency services immediately!", "Dispatch emergency services to Borah High School, 6001 W. Cassia Street, Boise, Id. 83709 to response to an emergency!", or other chosen message designed to communicate that emergency services are needed at a given facility to respond to an emergency. It is to be understood that a text message and an email message can be text and/or audio files. Accordingly, any example of a text message electronic notification presented above as a matter of illustration and reference can be in the form of a text and/or audio file sent via text message, and any example of an email message electronic notification presented above as a matter of illustration and reference can be in the form of a text and/or audio file sent via email message, according to the invention.

Control system 152 is still additionally configured to automatically issue an "emergency initiated message" to ISUs 150, in real-time in response to control system 152 receiving the emergency alert message from any of ISUs 150, and to issue an "emergency terminated message" to ISUs 150, in real-time in response to control system 152 receiving the emergency stand-down message from a boss ISU 150A. The emergency initiated message is a text message designed to inform the holders of ISUs 150 via their ISUs 150 that an alert has been issued, such as "lockdown initiated," "security alert initiated," or other chosen message designed to communicate at a lockdown or security alert has been initiated. Once alerted to an emergency via the emergency initiated message using ISUs 150, the holders of the ISUs 150 are triggered to be aware of an emergency and enabled to take any-and-all action to protect themselves and others from an emergency. The emergency terminated message is a text message designed to inform the holders of ISUs 150 via their ISUs 150 that the lockdown or security alert is terminated, such as "lockdown terminated," "release from lockdown," "all clear," or other chosen message. Once alerted to the termination via the emergency terminated message using ISUs 150, the holders of the ISUs 150 are triggered to be aware of a termination of an emergency and enabled to carry on with their day in a normal manner. Again, it is to be understood that a text message and an email message can be text and/or audio files. Accordingly, any example of an emergency initiated message and an emergency stand-down message presented above as a matter of illustration and reference can be in the form of a text and/or audio file sent via text message, and can be in the form of a text and/or audio file sent via email message, according to the invention. Having discussed the basics of security system 102, the hardware of system 102 will now be discussed.

Figure 2:
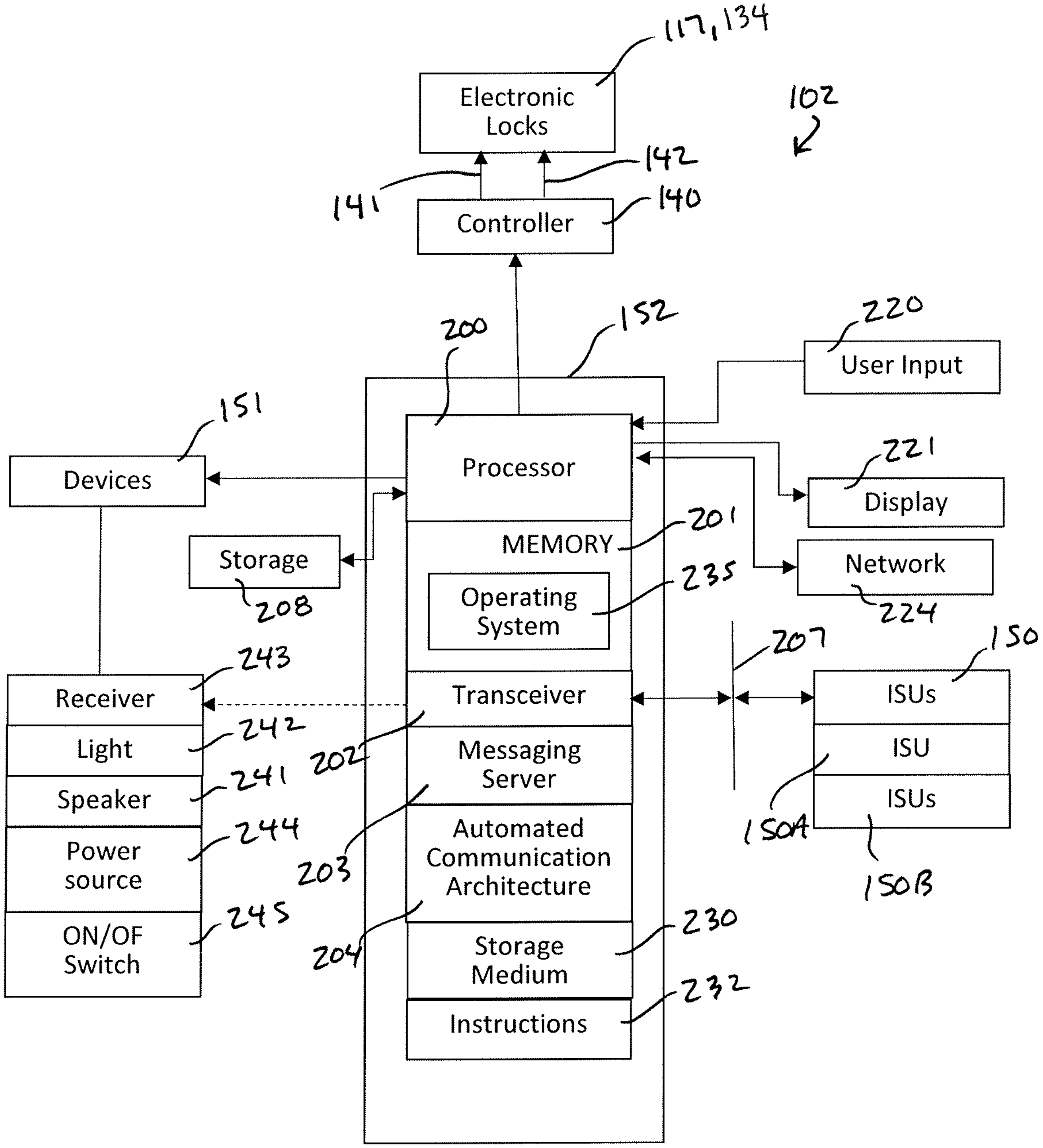
FIG. 2 is a high-level hardware block diagram of the security system incorporated with elements of the facility corresponding to FIG. 1.

Referring now to FIG. 2, illustrated a high-level hardware block diagram of security system 102 incorporated with elements of facility 100 corresponding to FIG. 1. In FIG. 2, control system 152 includes at least one processor 200 coupled to a storage or memory 201, a standard transceiver 202, a standard messaging server 203, and a standard automated communication architecture 204 for issuing an electronic notification as described above, which can be at least one of an automated text messaging architecture for automatically issuing at least one text message electronic notification, an automated email messaging architecture for automatically issuing at least one email message electronic notification, and an automatic dialer for automatically placing a phone call and that automatically plays a pre-recorded emergency message electronic notification once the call has been answered. Processor 200 is electrically connected to controller 140 via conventional electrical wiring 209, or wirelessly in an alternate embodiment such as via transceiver 202, in an example when controller 140 wirelessly enabled. Controller 140 is, in turn, electrically connected via conventional electrical wiring 141 to electronic locks 117, and to electronic gate lock 134 via conventional electrical wiring 142, thereby operatively coupling processor 200 of control system 152 to electronic locks 117 and 132 in signal communication. If desired, controller 140 can be operatively connected in signal communication wirelessly to electronic locks 117, and to electronic gate lock 134, in an example when controller 140 and locks 117 and 134 are wirelessly enabled, for operatively coupling processor 200 wirelessly in signal communication with locks 117 and 134.

Processor 200 represents one or more standard processors (e.g., microprocessors), and memory represents 201 random access memory (RAM) devices comprising a main storage, as well as any supplemental levels of memory e.g., cache memories, non-volatile or back-up memories (e.g. programmable or flash memories), read-only memories, any cache memory in the processor 200, as well as any storage capacity used as a virtual memory, e.g., as stored on a mass storage or memory device, such as storage or memory 208. In this example, the aforementioned text messages, addresses of ISUs 150, and electronic notifications are stored in storage 208, and they can be stored elsewhere. The electronic notifications can, if desired, be stored in automated communication architecture 204, whether in local storage or other chosen storage. Each stored ISU 150 address in security system 102 relates to an ISU 150 incorporated in security system 102. Accordingly, each ISU 150 the address of which is stored in storage 208 is registered or authorized ISU of security system 102, in which the user or holder of which is a registered or authorized user or holder of security system 102.

Control system 152 is operational in conjunction with transceiver 202. Transceiver 202 is a standard transceiver useful for customarily receiving text messages from ISUs 150 and customarily sending text messages to ISUs 150 across an appropriate cellular and/or computer network and/or Internet 207, and for issuing the emergency alert and emergency stand-down signals.

The hardware of security system 102 may include one or more user input devices 220 (e.g., a keyboard, a mouse, etc.) and a display 221 (e.g., a Cathode Ray Tube (CRT) monitor, a Liquid Crystal Display (LCD) panel). These input and output devices allow a user to input content to storage 208, including the chosen text messages, the addresses of ISUs 150 incorporated with security system 102, the pre-recorded electronic notifications, if desired, and other chosen information as may be appropriate. The hardware of security system 102 may further include an interface with one or more network (e.g., a local area network (LAN), a wide area network (WAN), a wireless network, and/or the Internet among others) such as network 224, to permit the communication of information with other networked computers or devices. It should be apparent to the skilled person that the hardware typically includes suitable analog and/or digital interfaces between processor 202 and each of the components 201, 202, 203, 204, 208, 220, and 221, as is well known in the art of networked and operatively connected devices.

Processor 200 is additionally coupled to a computer-readable storage medium or memory 230 including executable instructions 232 stored thereon that when executed by processor 200 cause processor to automatically effectuate the described operations of security system 102 in real-time, meaning the actual time during which a process takes place or an event occurs. Medium 230 can take on a variety of forms. For instance, medium 230 may take the form of program code (i.e., instructions 232) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, computer-readable storage medium 232 is not a signal, is not a transient signal, and is not a propagating signal. Medium 230 described herein is an article of manufacture. The hardware of control system 152 operates under the control of operating system 235 maintained by memory 201 enabling processor 200 to execute instructions 232 to effectuate the real-time operations of security system 102 according to this disclosure.

As explained above, devices 151 are identical. Each device 151 in that each device 151 is configured as at least one of an aural emergency alarm device for issuing an audible alert capable of being easily heard by an ordinary listener, a visual emergency alarm device for issuing a visual alert capable of being easily seen by an ordinary observer, and preferably as both an aural emergency alarm device and a visual emergency alarm device in a preferred embodiment, in response to the emergency alert signal, and to terminate the alert(s) in response to the emergency stand-down signal.

In FIG. 2, each device 151 is a stand-alone signal device including speaker 241, light 242, receiver 243, power source 244, and ON/OFF switch 245 electrically interconnected using standard electrical wiring. Speaker 241 and light 242 are signal devices of device 151, which are each configured to issue alerts/signals. Speaker 241 is a conventional siren that when activated emits an audible alert characterized by a penetrating warning sound capable of being easily heard by an ordinary listener in the vicinity of device 151 for audibly indicating an emergency situation. Light 242 is a conventional strobe, revolving, or other chosen emergency-type light that when activated emits a visual alert characterized by a penetrating warning light capable of being easily seen by an ordinary observer in the vicinity of device 151 for visually indicating an emergency situation. Receiver 243 is a standard receiver operatively connected, wirelessly in a preferred embodiment or via conventional electrical wiring in an alternate embodiment, in signal communication to transceiver 202 for operatively coupling device 151 in signal communication to processor 200 for receiving the emergency alert and emergency stand-down signals from transceiver 202, in which speaker 241 and light 242 automatically activate concurrently in real-time in response to the emergency alert signal for issuing the respective audible and visual alerts, and automatically deactivate concurrently in real-time in response to the emergency stand-down signal for terminating the respective audible and visual alerts.

Device 151 can be configured as an aural emergency alarm device in which speaker 241 automatically activates in real-time in response to the emergency alert signal for issuing the audible alert and automatically deactivates in real-time in response to the emergency stand-down signal for terminating the audible alert, a visual emergency alarm device in which light 242 automatically activates in real-time in response to the emergency alert signal for issuing the visual alert and automatically deactivates in real-time in response to the emergency stand-down signal for terminating the visual alert, and is preferably both in which speaker 241 and light 242 automatically activate concurrently in real-time in response to the emergency alert signal for issuing the respective audible and visual alerts, and automatically deactivate concurrently in real-time in response to the emergency stand-down signal for terminating the respective audible and visual alerts. In a particular embodiment as indicated above, device 151 can be operatively connected electrically via standard electrical wiring in signal communication to processor 200 for receiving the emergency alert and emergency stand-down signals from transceiver 202 and activating and deactivating in real-time in response to the respective emergency alert and emergency stand-down signals. Accordingly, devices 151 can each operatively connected wirelessly in signal communication to control system 152 for receiving the emergency alert and stand-down signals, and/or operatively connected electrically in signal communication to control system 152 via conventional electrical wiring for receiving the emergency alert and stand-down signals.

ON/OFF switch 245 is the main ON/OFF switch of device 151, and is a conventional and readily available toggle switch movable between an ON position empowering and activating device 151 and its various elements, and an OFF position deactivating such components. In the discussion of security system 102, ON/OFF switch 245 is enabled in the ON position in which device 151 is powered by power source 244, which in this embodiment is an onboard battery power source characterized by a conventional and lithium-on battery having a 4000 milli-ampere hour capacity, a 21-volt rated output, and a maximum continuous discharge current of 20 amps. Other suitable/standard onboard battery power sources can be selected and used for power source 244. If desired, a device 151 constructed and arranged in accordance with the principle of the invention can be without ON/OFF switch 245, and simply operation in response to being powered, whether by a battery power source or a dedicated power source, namely, standard electrical wiring.

In the operation of security system 102, devices 151 are deployed throughout facility 100 at the described locations thereof frequented by people, including in and around building 110 including inside building 110, including proximate to or in rooms 111 and elsewhere, and outside building 110 at outside gated area 130, as shown in FIG. 1. Each device 151 can be placed on a support surface, attached to a wall using one or more fasteners, brackets, adhesive, adhesive tape, suspended from a ceiling or other elevated surface, etc.

Each ISU 150 in security system 102 the address of which is stored in storage 208 is "registered" with security system 102, and is thereby an "authorized" or "registered" ISU of security system 102 held by an "authorized" or "registered" user or holder. In reference to FIGS. 1 and 2, in response to an actual or perceived threat at facility 100, security system 102 is triggered and operations start 260 in FIG. 3 in response to an authored user sending 261 an emergency alert message to control system 152 using his/her ISU 150, in which memory 230 being executable instructions 232 stored thereon are automatically executed by processor 200 in real-time in response to cause processor 200 to effectuate operations of security system 102. These operations effectuated by processor 200 in real-time in response to processor 200 executing instructions 232 stored on memory 230 occur automatically and in real-time, namely, the actual time during which a process takes place or an event occurs, and are discussed in detail below. When an emergency alert message is sent from an authorized ISU 150, that ISU is an "alerting" ISU 150. An emergency alert message is sent from an alerting ISU when the holder of that ISU is aware of or perceives an actual or perceived threat necessitating activation of security system 102, whether directly, or indirectly, including, for instance by receiving a text from another ISU 150 alerting the holder of the alerting ISU 150 of an actual or possible threat. The issuing of the emergency alert message is a triggering event that triggers the operation of security system 102.

The real-time operations effectuated by processor 200 include messaging server 203 receiving 262 via transceiver 202 the emergency alert message from the alerting ISU 150, which is a triggering event resulting in processor 200 automatically recognizing 265 both the address of the alerting ISU 150 by accessing storage 208 and comparing the address of the ISU 150 to the stored addresses stored in storage 208, and the emergency alert message from the alerting ISU 150 by accessing storage 208 and comparing the emergency alert message received from the alerting ISU 150 to one or more stored emergency alert messages stored in storage 208, and recognizing both the alerting ISU 150 in response to matching the address of the alerting ISU 150 to a corresponding address stored in storage 208 and the emergency alert message from the alerting ISU 150 in response to matching the emergency alert message from the alerting ISU 150 the corresponding emergency alert message stored in storage 208 thereby completing the receiving step 262. This recognizing 265 step, a sub-step of the receiving step 262, is identically performed each time an emergency alert message is sent from an ISU 150, i.e. an alerting ISU 150, to control system 152. When processor 200 fails to recognize the address of an ISU and/or the emergency alert message at recognizing step 265, such as might be the case in the event of a prank or hack for example, the receiving steps 262 fails and processor 200 is automatically unresponsive.

After recognizing 265 the alerting ISU 150 and the emergency alert message from the alerting ISU 150 thereby receiving 262 via transceiver 202 the emergency alert message from the alerting ISU 150, further operations include processor 200 automatically transmitting 266 an emergency alert signal via transceiver 202 responsive to the receiving 262 step, and each device 151 automatically activating thereby issuing an alert at step 268 for warning people at the various locations of facility 100 where devices 151 are deployed that an emergency is present, in response to the emergency alert signal, for enabling people at facility 100 to protect themselves, evacuate, and generally take any-and-all necessary steps to protect themselves from a given threat, including teachers initiating any standard safety protocols. The alert from each device 151 can be the audible alert from speaker 241, the visual alert from light 242, and preferably both as discussed above.

To deactivate devices 151 when an emergency situation no longer exists, additional real-time operations are effectuated by processor 200 in response to sending 270 an emergency stand-down message to control system 152 using boss ISU 150A including messaging server 203 receiving 272 via transceiver 202 the emergency stand-down message from boss ISU 150A, processor 200 automatically recognizing 274 both the address of boss ISU 150A by accessing storage 208 and comparing the address of the boss ISU 150A to the stored addresses stored in storage 208, and the emergency stand-down message from boss ISU 150A by accessing storage 208 and comparing the emergency stand-down message received from boss ISU 150A to one or more stored emergency stand-down messages stored in storage 208, and recognizing both boss ISU 150A in response to matching the address of ISU 150 to a corresponding address stored in storage 208 and the emergency stand-down message from boss ISU 150A in response to matching the emergency stand-down message from boss ISU 150A to the corresponding emergency stand-down message stored in storage 208 thereby completing the receiving step 272. This recognizing 274 step, a sub-step of the receiving step 272, is identically performed each time an emergency stand-down message is sent from a BOSS ISU 150A to control system 152. When processor 200 fails to recognize the address of an ISU and/or the emergency stand-down message at recognizing step 274, such as might be the case in the event of a prank or hack for example, processor 200 is automatically unresponsive. It is to be emphasized that processor 200 of control system 152 via instructions 232 is enabled to receive an emergency stand-down message from a boss ISU 150A, and is disabled from receiving an emergency stand-down message from other ISUs to ensure control over the emergency stand-down message to ensure that the stand-down operations are terminated by an authorized ISU of security system 102, a boss ISU 150A, and not by an unauthorized ISU.

After recognizing 274 boss ISU 150A and the emergency stand-down message from boss ISU 150A thereby receiving 272 via transceiver 202 the emergency stand-down message from boss ISU 150A, further operations include processor 200 automatically transmitting 276 an emergency stand-down signal via transceiver 202 responsive to receiving 272 via transceiver 202 the emergency stand-down message from BOSS ISU 150A, and each device 151 automatically deactivating 278 thereby automatically terminating the alert, in response to the emergency stand-down signal, which ends 280 the method. These operations are repeated each time an emergency alert message is issued from an ISU 150 to control system 152.

Figure 3:
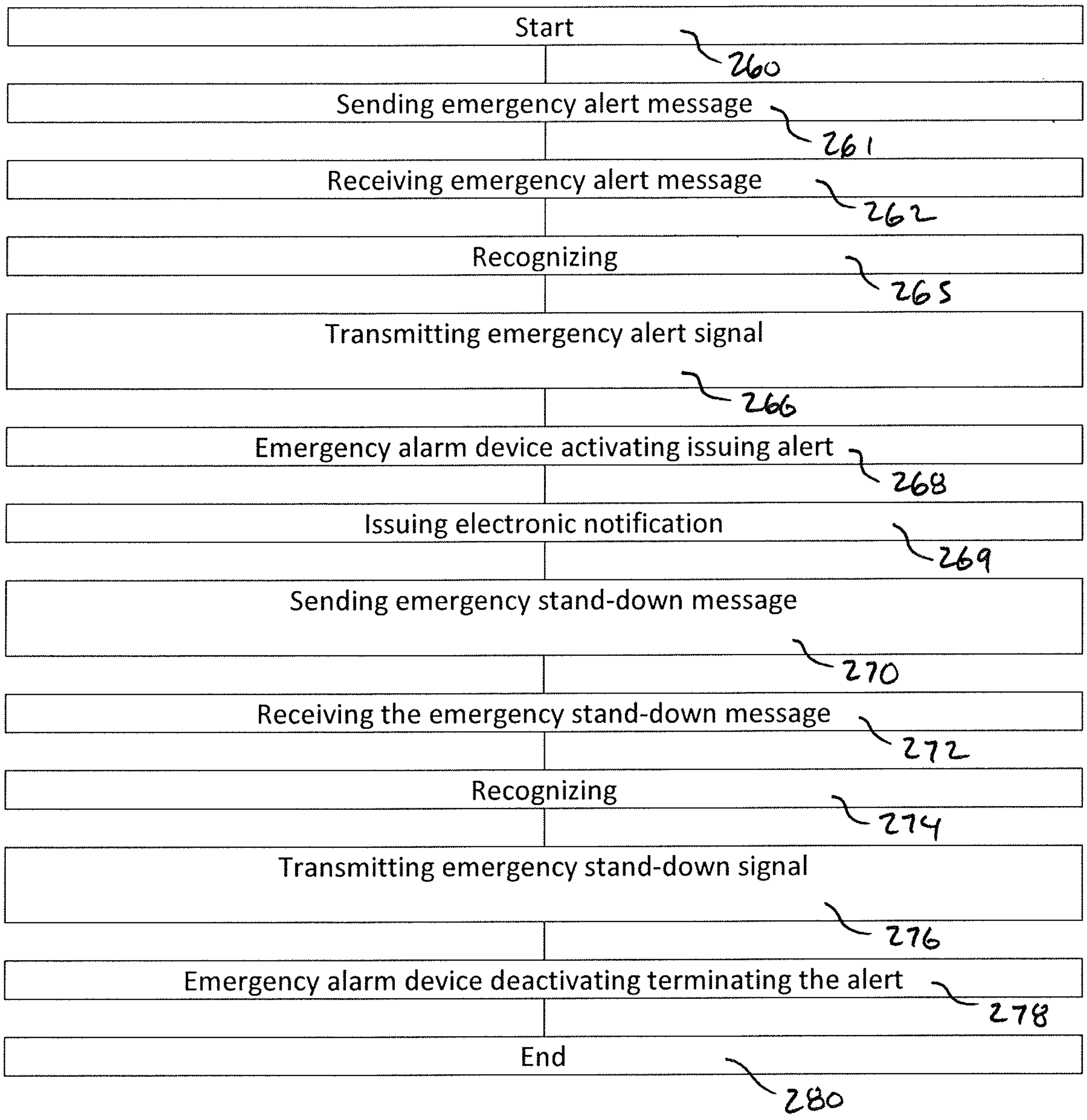
FIGS. 3-8 are flowcharts of security operations performed in accordance with the principle of the invention.
Figure 4:
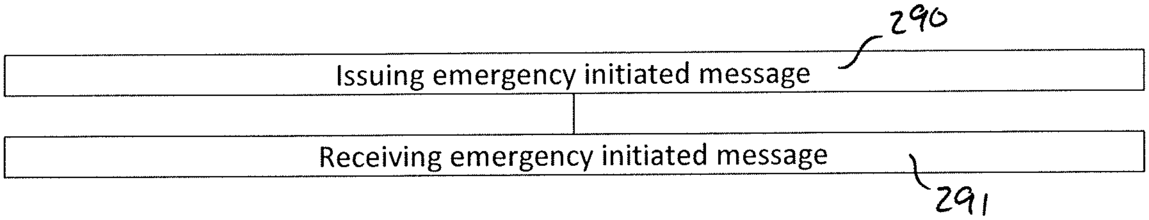
Figure 5:
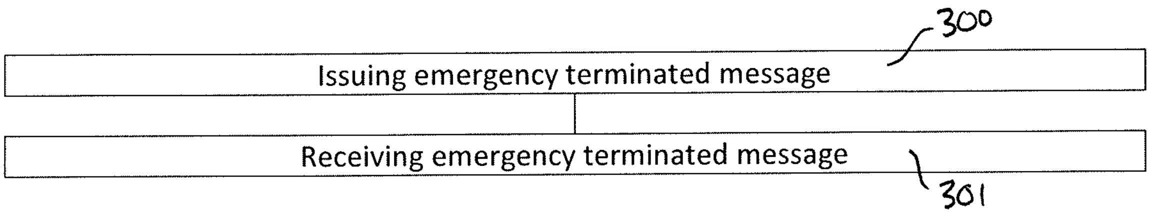
Figure 6:
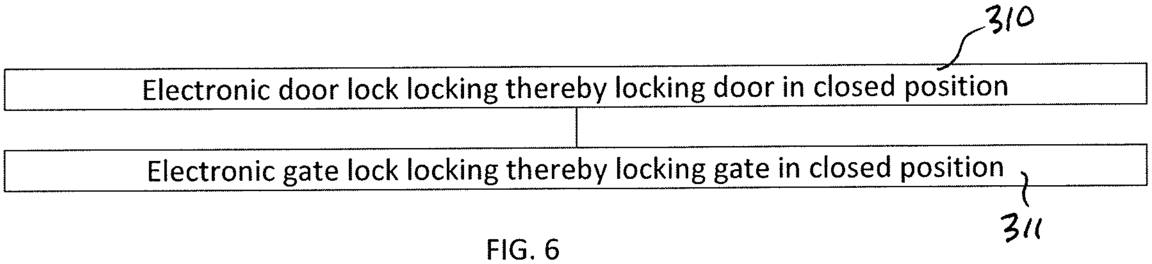
Figure 7:
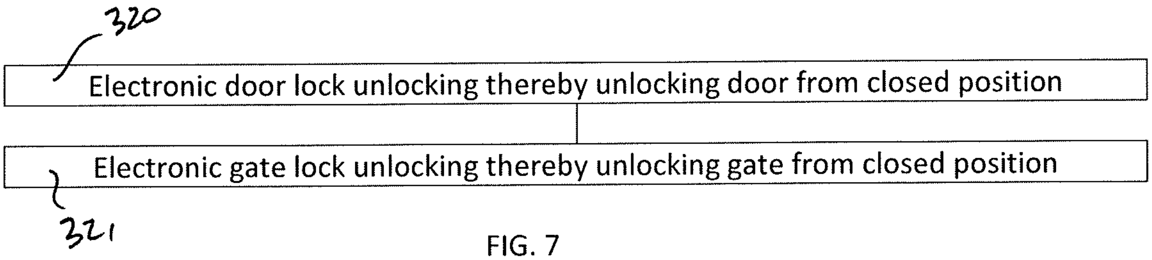

In an exemplary embodiment, after the receiving 262, recognizing 265, and transmitting 266 steps in FIG. 3, an additional real-time operation effectuated by processor 200 includes at step 269 automated communication architecture 204 automatically issuing an electronic notification, in response to the emergency alert signal. In one embodiment, the automated communication architecture 204 is an automated text messaging architecture and the electronic notification automatically issued by the automated text messaging architecture to at least one ISU address is at least one text message electronic notification intended to alert at least one intended recipient of an emergency via text messaging. In another embodiment, the automated communication architecture 204 is an automated email messaging architecture and the electronic notification automatically issued by the automated email messaging architecture to at least one ISU address is at least one email message electronic notification intended to alert at least one intended recipient of an emergency via email messaging. In yet another embodiment, the automated communication architecture 204 is an automatic dialer for automatically placing a phone call to at least one designated phone number and that automatically plays a pre-recorded emergency message electronic notification once the call has been answered to alert at least one intended recipient of an emergency by phone messaging. It is particularly advantageous that automated communication architecture 204 automatically issues at least one electronic notification in response to the emergency alert signal because it enables one or more intended recipients, i.e. one or more emergency services/responders to be appropriately alerted in real-time to the emergency situation and to appropriately respond in real-time to the emergency by dispatching police, fire, or other responders to the emergency as described above.

FIGS. 4-8 illustrate still additional operations of control system 152. After the receiving 262 and recognizing 265 steps in FIG. 3, an additional real-time operation effectuated by processor 200 includes messaging server 203 automatically transmitting 290 to ISUs 150 via transceiver 202 an emergency initiated message stored in storage 208, and ISUs 150 automatically receiving 291 the emergency initiated message in response for informing the holders of ISUs 150 via the emergency initiated messages received by the ISUs 150 that an alert has been issued. Again, once alerted to an emergency via the emergency initiated message using ISUs 150, the holders of the ISUs 150 are advantageously triggered to be aware of an emergency and enabled to take any-and-all action to protect themselves and others from an emergency. Further, after the receiving 272 and receiving 274 steps in FIG. 3, yet another real-time operation in FIG. 5 effectuated by processor 200 includes messaging server 203 transmitting 300 to ISUs 150 via transceiver 202 an emergency stand-down message stored in storage 208, and ISUs 150 automatically receiving 301 the emergency stand-down message for informing the holders of ISUs 150 that an alert has been lifted. Once alerted to the termination via the emergency terminated message using ISUs 150, the holders of the ISUs 150 are triggered to be aware of a termination of an emergency and enabled to carry on with their day in a normal manner.

Further real-time operations of control system 152 can also be effectuated in conjunction with locks 117 and 134 for locking down facility 100. As disclosed herein electronic locks 117 and 132 are coupled in signal communication to processor 200 for automatically responding in response to the emergency alert signal and the emergency stand-down signal. After recognizing 265 the alerting ISU 150 and the emergency alert message from the alerting ISU 150 and processor 200 automatically transmitting 266 the emergency alert signal via transceiver 202 responsive to receiving 262 via transceiver 202 the emergency alert message from the ISU 150, an additional operation includes electronic door locks 117 automatically locking 310 doors 115 and 120 in the closed positions and gate lock 134 automatically locking 311 gate 132 in the closed position thereby locking down rooms 111 and building 110 and outside gated area 130, in response to the emergency alert signal, all for securing building 110 and outside gated area 130 and the occupants therein from unauthorized intrusion. This locking down of facility provides an important scope of protection by impeding the ability of a would-be intruder or intruders from readily penetrating facility 100, including outside gated area 130 and the interior or inside of building 110. Further, after the receiving 272 and receiving 274 steps in FIG. 3 and also transmitting 276 the emergency stand-down signal, yet another real-time operation in FIG. 5 effectuated by processor 200 includes electronic door locks 117 automatically unlocking 320 doors 115 and 120 from the closed positions and gate lock 134 automatically unlocking 321 gate 132 from the closed position thereby unlocking rooms 111 and building 110 and outside gated area 130, in response to the emergency stand-down signal, all for unlocking building 110 and outside gated area 130 enabling free access through facility 100.

As described herein, facility 100 is a standard building construction frequented by people and used for a chosen activity. In an exemplary implementation of security system 102, facility 100 is generally representative of a standard school, whether a public or private school, in which building 110 is at least one school building, outside gated area 130 is, or is a part of, the outside part of a school campus, and rooms 111 define the various customary rooms of a school, including classrooms where teachers provide instruction to students, staff rooms where staff perform various duties related to the operation of the school, workshops where handcrafts are carried on, cafeterias where students eat meals, offices where administrative personnel work, lavatories fitted with equipment for people to wash the hands and face and use toilet facilities, gyms where students exercise, and the like.

A standard classroom is, of course, a location of where classes meet, where a class of students and at least one teacher meet. At least some of rooms 111 of building 110 are, therefore, classrooms, according to this disclosure, whether two or more classrooms. The number of students in a class of students can vary depending on the school, such as, for example five students, ten students, twenty students, fifty students, etc. Likewise, the number of teachers for given class of students can vary, such as one teacher, or more than one teacher. In some schools, particularly elementary schools, many classes have two teachers, one of which may be a student teacher. Students of a typical school, like facility 100, are each required to register as a student of the school. This is needed for the school to record the grades of each student, etc. Accordingly, a typical school customarily keeps records of each teacher and the students assigned to each class taught by that teacher.

For each teacher that teaches at the school represented by facility 100, stored in storage 208 are records of each teacher, each class the teacher teaches, each classroom for each class the teacher teaches, and the students in each class. With this information stored in storage 208, control system 152 is still additionally configured to automatically issue an "account for students message" to those ISUs 150 of security system 102 assigned to the teachers, namely, the teacher ISU's denoted at 150B in FIG. 1, in response to control system 152 receiving the emergency alert message from any of ISUs 150. The account for students message is a headcount request message. A teacher ISU 150B can be concurrently registered as a boss 150A, if desired. The account for students message can be part of the emergency initiated message, or a separate message. The account for students message is designed to request from each teacher to use his/her teacher ISU 150B to issue a headcount message in reply to control system 152 communicating the number of students in the class in real-time at the time of the given emergency. In response to receiving the headcount message from each teacher ISU 150B, control system 152 is responsive and automatically stores the received headcount message in storage 208 and at the same time matches and stores the number of students in the headcount message to the actual number of students in the class previously stored in storage 208. The files for each teacher and each corresponding class for each teacher are arranged in storage 208 according to any standard or chosen file management paradigm. Collecting the headcount for each class in relation to the actual number of students in each class provides a useful record for tracking student numbers for each class and correlating each headcount for each class the registered number of students for the corresponding class. The account for student message sent from control system 152 to each teacher ISU 150B is a text message stored in storage 208, such as "account for students," "student headcount," or other chosen text designed to communicate a request for a count of the number of students in the given class. The headcount message from each teacher ISU 150B is also a text message of the number of students in numerical form, such as 5, 10, 20, 30, 40, 50, etc.

Figure 8:
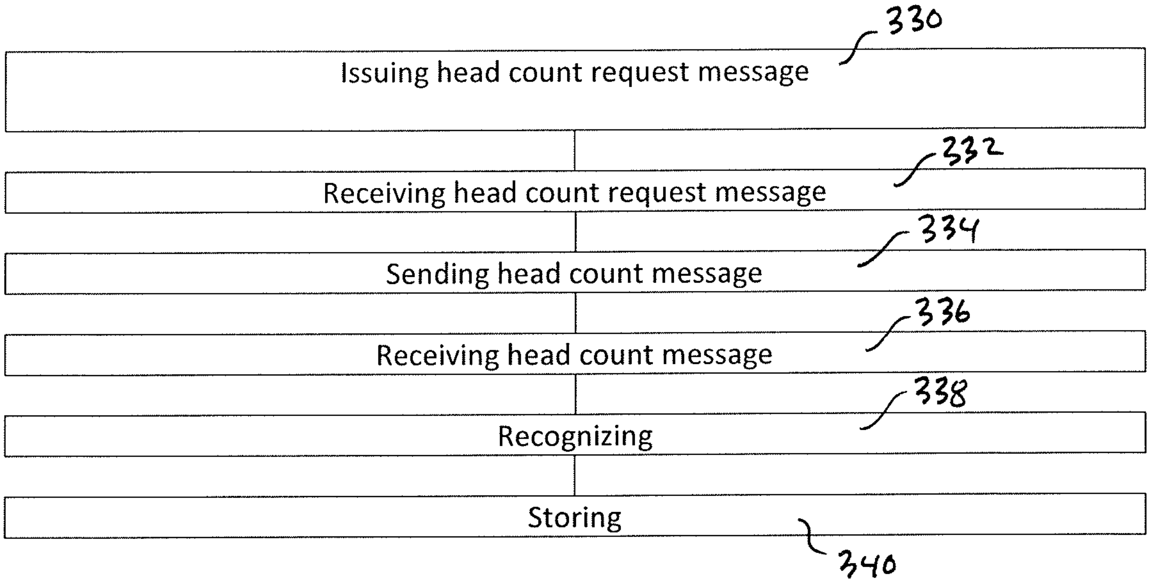

Accordingly, after the receiving 262 and recognizing 265 steps in FIG. 3, yet additional real-time operations effectuated by processor 200 in FIG. 8 include messaging server 203 automatically issuing 330 to each teacher ISU 150B via transceiver 202 an account for students message stored in storage 208, and each teacher ISU 150B automatically receiving 332 the account for students message in response. Having received the account for students message using teacher ISUs 150B, using the teacher ISUs 150B the method further includes each teacher sending 334 a headcount message to control system 152 using his/her teacher ISU 150B in response.

In response to a teacher sending 334 a headcount message to control system 152 his/her teacher ISU 150B, memory 230 being executable instructions 232 stored thereon are executed by processor 200 automatically in response to cause processor 200 to effectuate headcount operations of security system 102 in real-time. The real-time headcount operations effectuated by processor 200 include messaging server 203 receiving 336 via transceiver 202 the headcount message from the teacher ISU 150B, processor 200 automatically recognizing 338 the address of the teacher ISU 150B by accessing storage 208 and comparing the address of the teacher ISU 150B to the stored addresses stored in storage 208, and recognizing the teacher ISU 150B in response to matching the address of the teacher ISU 150B to a corresponding address stored in storage 208 thereby completing the receiving step 336. This recognizing step 338, a sub-step of the receiving step 336, is identically performed each time a headcount message is sent from a teacher ISU 150B to control system 152 in reply to an account for students message from control system 152. When processor 200 fails to recognize the address of the teacher ISU at recognizing step 338, such as might be the case in the event of a prank or hack for example, processor 200 is automatically unresponsive.

After recognizing 338 the teacher ISU 150B thereby receiving 336 via transceiver 202 the headcount message from the teacher ISU 150B, further operations include processor 200 automatically storing 340 the headcount message in storage 208 from the teacher ISU 150B and at the same time matching and storing the number of students in the headcount message to the actual number of students in the class previously stored in storage 208. Again, the files for each teacher and each corresponding class for each teacher are arranged in storage 208 according to any standard or chosen file management paradigm, and collecting the headcount for each class in relation to the actual number of students in each class is particularly advantageous for providing a useful record for tracking student numbers for each class and correlating each headcount for each class the registered number of students for the corresponding class.

As mentioned above, each ISU 150 in security system 102 the address of which is stored in storage 208 is "registered" with security system 102, and is thereby an "authorized" or "registered" ISU of security system 102 held by an "authorized" or "registered" user or holder. Storage 208 is maintained and updated via input and output devices 220 and 221 as needed to ensure the addresses in storage 208 are correct and accurately reflect those who frequent the given facility, to selectively update addresses designated as teacher ISUs, and boss ISUs, and to selectively update teacher, class, and student designations, and any additional desired information.

The above example illustrates the employment of security system 102 in conjunction facility 100 frequented by teachers and students. Security system 102 can be equally employed in a facility, i.e. a premises, including one or more buildings used for other purposes, including a business purpose, a manufacturing purpose, an energy generation purpose, a military purpose, etc. Accordingly, facilities/premises where security system 102 can be employed include office buildings and complexes, manufacturing plants, power plants, dams, military installations, etc.

Those having regard for the art will readily appreciate that an exemplary security system 102 and associated methods for providing emergency alerts and securing a premises are disclosed, which are uniquely useful for enabling users to activate alarms deployed at facility 100 or other chosen premises for providing penetrating audible/visual alerts to alert people frequenting facility 100 of a perceived, impending, or actual threat and to enable those alerted to protect themselves, evacuate, and generally take any-and-all necessary steps to protect themselves from a given threat, notify emergency services, and lockdown facility 100 simply by sending text messages using standard individual subscriber units of security system 102. Again, activating local alarms of security system 102 deployed at facility 100, notifying emergency services, and locking down facility 100 using individual subscriber units of security system 102 is particularly advantageous given that individual subscriber units, i.e. mobile devices, are readily available, ubiquitous, and are now customarily carried by the vast majority of people in modern society. Further, incorporating ISUs into security system simply by storing their corresponding addresses into storage is simple and efficient without the need for the facility to purchase the ISUs. Furthermore, an ISU of security system 102 can be designated as a boss ISU and a teacher ISU. Security system 102 incorporates a plurality of emergency alarm devices 151 for issuing penetrating audible/visual alerts to alert people frequenting various vicinities of facility 100. A security system constructed and arranged in accordance with the principle of the invention can incorporate at least one device 151 for providing penetrating audible/visual alerts to alert people frequenting a vicinity of a given facility, or more than one device 151 for providing penetrating audible/visual alerts to alert people frequenting more than one vicinity of a given facility.

According to the principle of the invention, in a particular aspect security system 102 includes ISU 150A, emergency alarm device 151 deployed proximate to a location frequented by people, and control system 152. Control system 152 is configured to a) receive an emergency alert message from ISU 150A, b) receive an emergency stand-down message from ISU 150A, c) automatically transmit an emergency alert signal in response to control system 152 receiving the emergency alert message from ISU 150A, and d) automatically transmit an emergency stand-down signal in response to control system 152 receiving the emergency stand-down message from ISU 150A, and emergency alarm device 151 is operatively coupled to control system 152 for automatically issuing an alert for warning people at the location that an emergency is present, in response to the emergency alert signal, and automatically terminating the alert, in response to the emergency stand-down signal. The emergency alarm device 151 is an aural emergency alarm device, and the alert is an audible alert characterized by a penetrating sound. In another embodiment, the emergency alarm device 151 is a visual emergency alarm device, and the alert is a visual alert characterized by a penetrating light. The emergency alarm device 151 is stand-alone and operatively coupled wirelessly to control system 152. In an illustrative embodiment, the location is inside 112 of building 110, and there are door by which an entry to the inside of the building or to a part of the inside of the building is closed when the door is in a closed position and opened when the door is in an open position, and an electronic door lock for automatically locking for locking the door in the closed position in response to the emergency alert signal, and automatically unlocking for unlocking the door from the closed position in response to the emergency stand-down signal. The door, the entry, and the electronic door lock can be a door 115, corresponding entry 116, and corresponding electronic door lock 117, or door 120, corresponding entry 121, and corresponding electronic door lock 117. In another embodiment, the location is outside gated area 130, and there are gate 132 by which entry 133 to outside gated area 130 is closed when gate 132 is in a closed position and opened when gate 132 is in an open position, and electronic gate lock 134 for automatically locking for locking gate 132 in the closed position in response to the emergency alert signal, and automatically unlocking for unlocking gate 132 from the closed position in response to the emergency stand-down signal. An automated communication architecture 204 is operatively coupled to control system 152 for automatically issuing an electronic emergency notification, in response to the emergency alert signal. The control system 152 is additionally configured to automatically issue an emergency initiated message to ISU 150A, in response to control system 152 receiving the emergency alert message from ISU 150A, and to automatically issue an emergency terminated message to ISU 150A, in response to control system 152 receiving the emergency stand-down message from ISU 150A.

In another aspect, security system 102 includes a first ISU 150, second ISU 150A, emergency alarm device 151 proximate to location frequented by people, and control system 152. Control system 152 is configured to a) receive an emergency alert message from first ISU 150, b) receive an emergency stand-down message from second ISU 150A, c) automatically transmit an emergency alert signal in response to control system 152 receiving the emergency alert message from the first ISU 150, and d) automatically transmit an emergency stand-down signal in response to control system 152 receiving the emergency stand-down message from second ISU 150A, and emergency alarm device 151 is operatively coupled to control system 152 for automatically issuing an alert for warning people at the location that an emergency is present, in response to the emergency alert signal, and automatically terminating the alert, in response to the emergency stand-down signal. First ISU 150 and second ISU 150A are different from one another, meaning that first ISU 150 and second ISU 150A are not the same ISU, and control system 152 is disabled from receiving the emergency stand-down message from first ISU 150. The emergency alarm device 151 is an aural emergency alarm device, and the alert is an audible alert characterized by a penetrating sound. In another embodiment, emergency alarm device 151 is a visual emergency alarm device, and the alert is a visual alert characterized by a penetrating light. Emergency alarm device 151 is stand-alone and operatively coupled wirelessly to control system 152. In an illustrative embodiment, the location is inside 112 of building 110, and there are a door by which an entry to the inside of the building or to a part of the inside of the building is closed when the door is in a closed position and opened when the door is in an open position, and an electronic door lock for automatically locking for locking the door in the closed position in response to the emergency alert signal, and automatically unlocking for unlocking the door from the closed position in response to the emergency stand-down signal. The door, the entry, and the electronic door lock can be a door 115, corresponding entry 116, and corresponding electronic door lock 117, or door 120, corresponding entry 121, and corresponding electronic door lock 117. In another embodiment, the location is outside gated area 130, and there are gate 132 by which entry 133 to outside gated area 130 is closed when gate 132 is in a closed position and opened when gate 132 is in an open position, and electronic gate lock 134 for automatically locking for locking gate 132 in the closed position in response to the emergency alert signal, and automatically unlocking for unlocking gate 132 from the closed position in response to the emergency stand-down signal. An automated communication architecture 204 is operatively coupled to control system 152 for automatically issuing an electronic emergency notification, in response to the emergency alert signal. Control system 152 is additionally configured to automatically issue an emergency initiated message to first ISU 150 and second ISU 150A, in response to control system 152 receiving the emergency alert message from first ISU 150, and to automatically issue an emergency terminated message to first ISU 150 and second ISU 150A, in response to control system 152 receiving the emergency stand-down message from second ISU 150A.

In yet another aspect, security system 102 includes first ISUs 150, second ISU 150A, emergency alarm devices 151 proximate to different locations each frequented by people, and control system 152. Control system 152 is configured to a) receive an emergency alert message from each of first ISUs 150, b) receive an emergency stand-down message from second ISU 150A, c) automatically transmit an emergency alert signal in response to the control system 152 receiving the emergency alert message from any of first ISUs 150, and d) automatically transmit an emergency stand-down signal in response to control system 152 receiving the emergency stand-down message from second ISU 150A, emergency alarm devices 151 are each operatively coupled to control system 152 for automatically issuing an alert for warning people at the respective location that an emergency is present, in response to the emergency alert signal, and automatically terminating the alert, in response to the emergency stand-down signal, and first ISUs 150 and second ISU 150A are different from one another, meaning that second ISU 150A is not the same ISU as each of the first ISUs 150, and control system 152 is disabled from receiving the emergency stand-down message from each of first ISUs 150. Each emergency alarm device 151 is at least one of a) an aural emergency alarm device and the alert is an audible alert, and b) a visual emergency alarm device and the alert is a visual alert. Each emergency alarm device 151 is stand-alone and operatively coupled wirelessly to control system 152. In an illustrative embodiment, the locations are partitioned parts of an inside of a building, and there are doors by which entries to the partitioned parts are closed when the doors are in closed positions and opened when the doors are in open positions, and electronic door locks for automatically locking for locking the respective doors in the closed positions in response to the emergency alert signal, and automatically unlocking for unlocking the respective doors from the closed position in response to the emergency stand-down signal. The doors, the entries, and electronic door lock can be doors 115,120 corresponding entries 116, 121, and corresponding electronic door locks 117. Building 110 is located within outside gated area 130, and there are gate 132 by which entry 133 to outside gated area 130 is closed when gate 132 is in a closed position and opened when gate 132 is in an open position, and electronic gate lock 134 for automatically locking for locking gate 132 in the closed position in response to the emergency alert signal, and automatically unlocking for unlocking gate 132 from the closed position in response to the emergency stand-down signal. An automated communication architecture 204 is operatively coupled to control system 152 for automatically issuing an electronic emergency notification, in response to the emergency alert signal. Control system 152 is additionally configured to automatically issue an emergency initiated message to first ISUs 150 and second ISU 150A, in response to control system 152 receiving the emergency alert message from any of first ISUs 150, and to automatically issue an emergency terminated message to first ISUs 150 and second ISU 150A, in response to control system 152 receiving the emergency stand-down message from second ISU 150A.

In yet still a further aspect, an apparatus includes first ISU 150, processor 200, transceiver 202 coupled with processor 200, emergency alarm device 151 proximate to a location frequented by people, and memory 230 including executable instructions 232 stored thereon that when executed by processor 200 cause processor 200 to effectuate operations in real-time including receiving 262 via transceiver 202 an emergency alert message from ISU 150, and automatically transmitting 266 an emergency alert signal via transceiver 202 responsive to the receiving 262 via transceiver 202 the emergency alert message from ISU 150, wherein emergency alarm device 151 automatically issues an alert for warning people at the location that an emergency is present, in response to the emergency alert signal. Additionally included is second ISU 150A different from first ISU 150, meaning that second ISU 150A and first ISU 150 are not the same ISU, and additional operations include receiving 272 via transceiver 202 an emergency stand-down message from second ISU 150A, and automatically transmitting 276 an emergency stand-down signal via transceiver 202 responsive to the receiving 272 via the transceiver 202 the emergency stand-down message from second ISU 150A, wherein emergency alarm device 151 automatically terminates the alert, in response to the emergency stand-down signal. Emergency alarm device 151 is an aural emergency alarm device 151, and the alert is an audible alert characterized by a penetrating sound. In another embodiment, emergency alarm device 151 is a visual emergency alarm device 151, and the alert is a visual alert characterized by a penetrating light. Emergency alarm device 151 is stand-alone and coupled wirelessly with transceiver 202. The location is inside 112 of building 110, and there are a door by which an entry to one of the inside of building and a part of the inside of building 110, such as a partitioned part of the inside of building 110, is closed when the door is in a closed position and opened when the door is in an open position, and an electronic door lock for automatically locking for locking the door in the closed position in response to the emergency alert signal, and automatically unlocking for unlocking the door from the closed position in response to the emergency stand-down signal. The door, the entry, and the electronic door lock can be a door 115, corresponding entry 116, and corresponding electronic door lock 117, or door 120, corresponding entry 121, and corresponding electronic door lock 117. Building 110 is located within outside gated area 130, and there are gate 132 by which entry 133 to outside gated area 130 is closed when gate 132 is in a closed position and opened when gate 132 is in an open position, and electronic gate lock 134 for automatically locking for locking gate 132 in the closed position in response to the emergency alert signal, and automatically unlocking for unlocking gate 132 from the closed position in response to the emergency stand-down signal. Additionally included is an automated communication architecture 204 for automatically, in response to the emergency alert signal. Messaging server 203 is coupled with processor 200. A further operation responsive to the receiving 262 via transceiver 202 the emergency alert message from first ISU 150 include messaging server 203 automatically issuing 290 an emergency initiated message to first ISU 150 and second ISU 150A via transceiver 202. Yet another operation responsive to the receiving 272 via the transceiver 202 the emergency stand-down message from the second ISU 150A include the messaging server 203 automatically issuing 300 an emergency terminated message to first ISU 150 and second ISU 150 via transceiver 202. Still an additional operation responsive to the receiving 262 via the transceiver 202 the emergency alert message from first ISU 150 includes messaging server 203 automatically issuing 330 a headcount request message to at least one of first ISU 150 and second ISU 150A via the transceiver 202, in which one if first ISU 150 and second ISU 150A can be concurrently operative as an ISU 150B.

Figure 9:
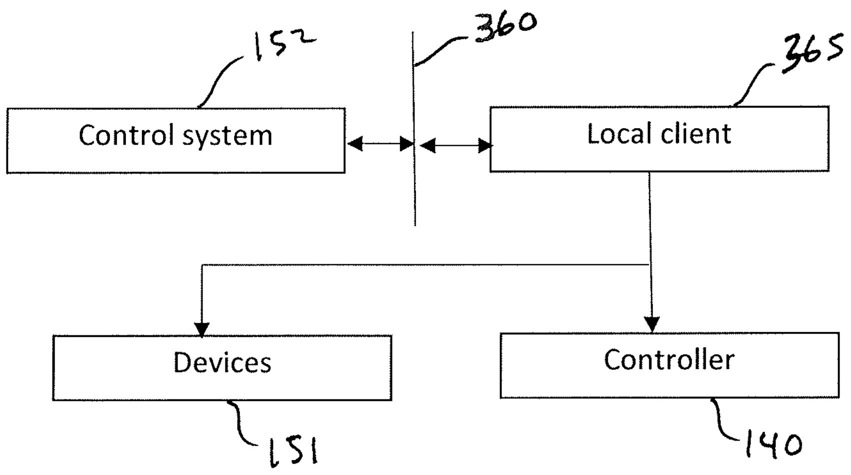
FIG. 9 is a high-level block diagram of an alternate configuration of the security system of FIG. 1.

The present invention is described above with reference to illustrative embodiments. However, those skilled in the art will recognize that changes and modifications may be made in the described embodiments without departing from the nature and scope of the present invention. For instance, in the embodiments discussed above control system 152 is a local system. In an alternate embodiment in FIG. 9, control system 152 can be a remote hosted system remotely connected conventionally over a network 360, such as an Internet, to a local client 365 deployed at facility 100 and operatively coupled wirelessly and/or electrically via conventional electrical wiring to controller 140 and devices 151. Local client 365 can be a standard computer for establishing a remote connection to control system 152 deployed offsite at a server-based computing environment, a "thin client," a conventional lightweight computer optimized conventionally for establishing a remote connection to control system 152 deployed offsite at a server-based computing environment, or the like. In this configuration, control system 152 and local client 365 work in concert in the operation of security system 102 discussed in detail above. Furthermore, locks 117 and 134 can each be electrically configured with a device 151 constructed and arranged in accordance with the principle of the invention if so desired according to the skill attributed to the skilled electrician. Additionally, devices 151 can be network together in a mesh network, a type of local network topology in which the infrastructure nodes (i.e. bridges, switches, receivers 243, or other infrastructure devices) connect directly, dynamically and non-hierarchically to as many other nodes as possible and cooperate with one another to efficiently route data from/to each other and even to corresponding locks 117 and 134, if desired, functioning as repeaters for receiving and routing the emergency alert and stand-down signals to corresponding locks 117 and 134. In this configuration, devices 151 can be configured with conventional repeaters or receivers 243 additionally configured as repeaters that receive and retransmit emergency alert and emergency stand-down signals to each other and to corresponding locks 117 and 134.

Various further changes and modifications to the embodiments herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. A security system, comprising:

a first individual subscriber unit, and a second individual subscriber unit;

an emergency alarm device proximate to a location frequented by people;

a control system configured to a) receive an emergency alert message from the first individual subscriber unit, b) receive an emergency stand-down message from the second individual subscriber unit, c) automatically transmit an emergency alert signal in response to the control system receiving the emergency alert message from the first individual subscriber unit, and d) automatically transmit an emergency stand-down signal in response to the control system receiving the emergency stand-down message from the second individual subscriber unit;

the emergency alarm device is operatively coupled to the control system for automatically issuing an alert for warning people at the location that an emergency is present, in response to the emergency alert signal, and automatically terminating the alert, in response to the emergency stand-down signal; and the first individual subscriber unit and the second individual subscriber unit are different from one another, and the control system is disabled from receiving the emergency stand-down message from the first individual subscriber unit.

2. The security system according to claim 1, wherein the emergency alarm device is an aural emergency alarm device, and the alert is an audible alert.

3. The security system according to claim 1, wherein the emergency alarm device is a visual emergency alarm device, and the alert is a visual alert.

4. The security system according to claim 1, wherein the emergency alarm device is stand-alone and operatively coupled wirelessly to the control system.

5. The security system according to claim 1, wherein the location comprises an inside of a building.

6. The security system according to claim 5, additionally comprising a door by which an entry to the inside of the building or to a part of the inside of the building is closed when the door is in a closed position and opened when the door is in an open position, and an electronic door lock for automatically locking for locking the door in the closed position in response to the emergency alert signal, and automatically unlocking for unlocking the door from the closed position in response to the emergency stand-down signal.

7. The security system according to claim 1, wherein the location comprises an outside gated area.

8. The security system according to claim 7, additionally comprising a gate by which an entry to the outside gated area is closed when the gate is in a closed position and opened when the gate is in an open position, and an electronic gate lock for automatically locking for locking the gate in the closed position in response to the emergency alert signal, and automatically unlocking for unlocking the gate from the closed position in response to the emergency stand-down signal.

9. The security system according to claim 1, additionally comprising an automated communication architecture operatively coupled to the control system for automatically issuing an electronic emergency notification, in response to the emergency alert signal.

10. The security system according to claim 1, additionally comprising the control system configured to automatically issue an emergency initiated message to the first individual subscriber unit and the second individual subscriber unit, in response to the control system receiving the emergency alert message from the first individual subscriber unit.

11. The security system according to claim 10, additionally comprising the control system configured to automatically issue an emergency terminated message to the first individual subscriber unit and the second individual subscriber unit, in response to the control system receiving the emergency stand-down message from the second individual subscriber unit.

12. A security system, comprising:

first individual subscriber units, and a second individual subscriber unit;

emergency alarm devices proximate to different locations each frequented by people;

a control system configured to a) receive an emergency alert message from each of the first individual subscriber units, b) receive an emergency stand-down message from the second individual subscriber unit, c) automatically transmit an emergency alert signal in response to the control system receiving the emergency alert message from any of the first individual subscriber units, and d) automatically transmit an emergency stand-down signal in response to the control system receiving the emergency stand-down message from the second individual subscriber unit;

the emergency alarm devices are each operatively coupled to the control system for automatically issuing an alert for warning people at the respective location that an emergency is present, in response to the emergency alert signal, and automatically terminating the alert, in response to the emergency stand-down signal; and the first individual subscriber units and the second individual subscriber unit are different from one another, and the control system is disabled from receiving the emergency stand-down message from each of the first individual subscriber units.

13. The security system according to claim 12, wherein each said emergency alarm device is at least one of a) an aural emergency alarm device and the alert is an audible alert, and b) a visual emergency alarm device and the alert is a visual alert.

14. The security system according to claim 12, wherein each said emergency alarm device is stand-alone and operatively coupled wirelessly to the control system.

15. The security system according to claim 12, wherein the locations comprise partitioned parts of an inside of at least one building.

16. The security system according to claim 15, additionally comprising doors by which entries to the partitioned parts are closed when the doors are in closed positions and opened when the doors are in open positions, and electronic door locks for automatically locking for locking the respective doors in the closed positions in response to the emergency alert signal, and automatically unlocking for unlocking the respective doors from the closed position in response to the emergency stand-down signal.

17. The security system according to claim 16, additionally comprising:

the at least one building located within an outside gated area;

a gate by which an entry to the outside gated area is closed when the gate is in a closed position and opened when the gate is in an open position; and an electronic gate lock for automatically locking for locking the gate in the closed position in response to the emergency alert signal, and automatically unlocking for unlocking the gate from the closed position in response to the emergency stand-down signal.

18. The security system according to claim 12, additionally comprising an automated communication architecture operatively coupled to the control system for automatically issuing an electronic emergency notification, in response to the emergency alert signal.

19. The security system according to claim 12, additionally comprising the control system configured to automatically issue an emergency initiated message to the first individual subscriber units and the second individual subscriber unit, in response to the control system receiving the emergency alert message from any of the first individual subscriber units.

20. The security system according to claim 19, additionally comprising the control system configured to automatically issue an emergency terminated message to the first individual subscriber units and the second individual subscriber unit, in response to the control system receiving the emergency stand-down message from the second individual subscriber unit.

21. An apparatus, comprising:

a first individual subscriber unit;

a second individual subscriber unit different from the first individual subscriber unit;

a transceiver and a messaging server each coupled with a processor;

an emergency alarm device proximate to a location frequented by people; and memory comprising executable instructions stored thereon that when executed by the processor cause the processor to effectuate operations in real-time comprising:

receiving via the transceiver an emergency alert message from the first individual subscriber unit; and in response thereto automatically transmitting an emergency alert signal via the transceiver, wherein the emergency alarm device automatically issues an alert for warning people at the location that an emergency is present, in response to the emergency alert signal, and the messaging server a) automatically issuing an emergency initiated message to the first individual subscriber unit and the second individual subscriber unit via the transceiver, and b) automatically issuing a headcount request message to at least one of the first individual subscriber unit and the second individual subscriber unit via the transceiver.

22. The apparatus according to claim 21, additional operations of the processor comprising:

receiving via the transceiver an emergency stand-down message from the second individual subscriber unit; and automatically transmitting an emergency stand-down signal via the transceiver responsive to the receiving via the transceiver the emergency stand-down message from the second individual subscriber unit, wherein the emergency alarm device automatically terminates the alert, in response to the emergency stand-down signal.

23. The apparatus according to claim 22, wherein the emergency alarm device is an aural emergency alarm device, and the alert is an audible alert.

24. The apparatus according to claim 22, wherein the emergency alarm device is a visual emergency alarm device, and the alert is a visual alert.

25. The apparatus security system according to claim 22, wherein the emergency alarm device is stand-alone and coupled wirelessly with the transceiver.

26. The apparatus according to claim 22, wherein the location comprises an inside of a building.

27. The apparatus according to claim 26, additionally comprising a door by which an entry to the inside of the building or to a part of the inside of the building is closed when the door is in a closed position and opened when the door is in an open position, and an electronic door lock for automatically locking for locking the door in the closed position in response to the emergency alert signal, and automatically unlocking for unlocking the door from the closed position in response to the emergency stand-down signal.

28. The apparatus according to claim 27, additionally comprising:

the building located within an outside gated area;

a gate by which an entry to the outside gated area is closed when the gate is in a closed position and opened when the gate is in an open position; and an electronic gate lock for automatically locking for locking the gate in the closed position in response to the emergency alert signal, and automatically unlocking for unlocking the gate from the closed position in response to the emergency stand-down signal.

29. The apparatus according to claim 22, further comprising an automated communication architecture operatively coupled to the control system for automatically issuing an electronic emergency notification, in response to the emergency alert signal.

30. The apparatus according to claim 21, a further operation responsive to the receiving via the transceiver the emergency stand-down message from the second individual subscriber unit includes the messaging server automatically issuing an emergency terminated message to the first individual subscriber unit and the second individual subscriber unit via the transceiver.

* * * * *